Aug. 20, 1940.  B. R. BENJAMIN  2,211,878
SOIL TREATING ELEMENT
Filed Nov. 16, 1939
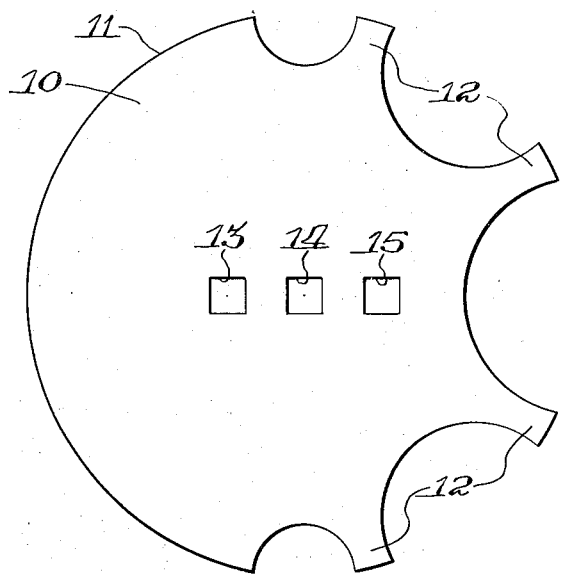
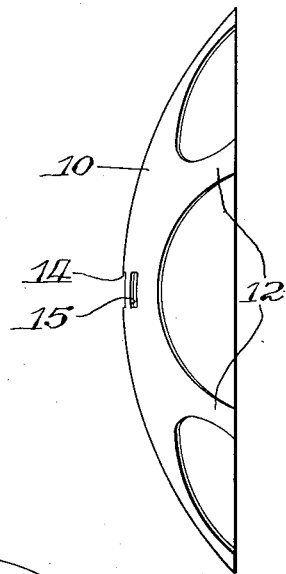
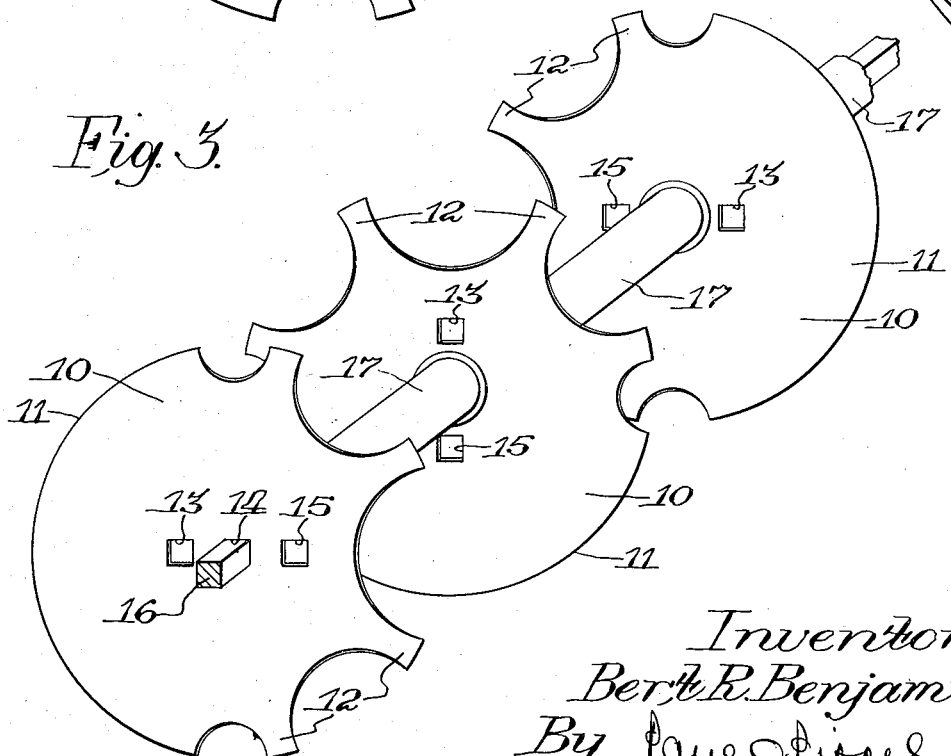
Inventor
Bert R. Benjamin
By Paul O. Pippel
Atty.

Patented Aug. 20, 1940

2,211,878

UNITED STATES PATENT OFFICE 2,211,878

SOIL TREATING ELEMENT

Bert R. Benjamin, Oak Park, Ill., assignor to International Harvester Company, a corporation of New Jersey Application November 16, 1939, Serial No. 304,671

15 Claims. (Cl. 97—220)

This invention relates to an agricultural machine or implement, and particularly to elements to be used in this machine, the elements being particularly adapted to a machine or implement to be operated over a field for the purpose of treating the soil by forming basins or pits therein to conserve the soil and prevent erosion thereof. The invention contemplates the provision of improved soil-treating elements and constitutes principally an improvement in the structure forming the subject-matter of assignee's Patent No. 2,136,607, dated November 15, 1938. The invention also contemplates the provision of improved soil-treating elements usable in other implements or devices as desired.

The implement or machine forming the subject-matter of the patent referred to above is of the so-called harrow plow type having a gang comprising a shaft on which a plurality of axially spaced disks are mounted. The disks are, of course, mounted for rotation with the shaft and the gang is drawn over the field with the shaft axis arranged at an angle to the line of draft. The patented structure discloses a plurality of disks mounted eccentrically on the shaft, that is, each disk is mounted on the shaft at a point spaced radially from the disk center. This provision enables the disks to form alternate basins or pits in the field. The present invention concerns itself particularly with an improved form of disk adapted to be used in a gang such as that previously referred to.

One of the problems arising in the provision of machines or implements adapted to treat the soil so as to provide basins or pits therein is the extra provision of suitable soil-treating or tilling elements that will perform continually and efficiently. In some instances a certain amount of slippage of the elements occurs and the gang shaft is adapted to rotate only at intervals. Such slippage occurs especially where a single element is used or where a plurality of elements are used but not arranged for conjoint rotation. The present invention contemplates, among others, all such uses.

The principal object of the present invention, then, is to provide an improved form of tilling element including a cutting edge and a driving portion.

An important object of the invention is to utilize such elements in conjunction with another element or other elements, so that the driving portion of one will engage the ground substantially coincident with the engagement with the ground of the cutting edge or portion of another element.

Another object of the invention specifically is to provide an improved tilling or soil-treating element in the form of a generally circular disk having a portion of its periphery constituting a cutting edge and another portion of its periphery cut away or notched to provide fingers or tooth portions.

Another object is to provide for spacing the notches at varying intervals, preferably progressively increasing and decreasing, so that appropriate leverages are obtained as the driving or notched portion engages the soil.

Another object is to provide an element with means for mounting the same on a shaft at an eccentric portion of the element.

Other objects of the invention will become apparent to those skilled in the art as the disclosure is more fully made in the following detailed description taken in conjunction with the accompanying sheet of drawings, in which:

Figure 1 is a face view of a preferred form of soil-treating element;

Figure 2 is an edge view of the same; and,

Figure 3 is a perspective view illustrating a preferred manner of mounting a plurality of elements for combined operation.

A preferred form of tilling element, as illustrated, comprises generally a circular member or disk 10 having substantially a semicircular portion of its periphery constituting an arcuate, continuous soil-engaging or cutting edge 11. The remaining or other substantially semicircular portion of the periphery of the element is generally notched or cut away to provide a plurality of circumferentially spaced fingers or tooth portions 12. The generally notched portion of the element constitutes a second soil-engaging edge or portion, which may be referred to as a driving portion, arranged substantially diametrically opposite the soil-cutting edge 11. The angular extent of the arcuate cutting edge 11 is considerably greater than the angular extent of any one of the fingers or teeth 12. The notches or spaces between the teeth 12 progressively increase and decrease about the cut-away periphery of the element; that is, the notch or spacing next adjacent one end of the cutting edge 11 is comparatively small, the next notch or space is comparatively larger, and the next space is still larger; and the next two notches or spaces are progressively smaller. The disk is preferably formed with the notches and teeth or fingers arranged symmetrically about the cut-away or driving portion.

The disk is further provided with a plurality of openings 13, 14, and 15, these openings providing means for mounting the element or disk on a shaft or the like. The opening 14 is preferably located at the exact center of the disk, while the openings 13 and 15 are located eccentrically—at points radially spaced from the true center of the disk.

Figure 3 illustrates a use of the disk such as that disclosed in the patented structure referred to above. A shaft 16 is arranged and supported in a gang of an implement in the conventional manner. The supporting structure for this shaft has not been shown, since such structure is well known to those skilled in the art.

The shaft is square in cross section and is adapted to be passed through any one of the openings in the disk 10, as necessity or desire dictates. The drawing illustrates the disk and shaft assembly as having the disks mounted on the shaft by means of the central opening 14. The disks are mounted on the shaft in axially spaced relation and intermediate spacing sleeves 17 are provided to maintain this spacing. The cooperation between the square shaft and the square openings provides for simultaneous rotation of all the disks with the shaft. In a preferred arrangement of the disks on the shaft, one disk has its continuous cutting portion 11 overlapping at least a part of the cut-away or driving portion of an adjacent disk; or, as may be said, the cutting portion of one disk is angularly offset with respect to the cutting portion of an adjacent disk. It will be understood, of course, that the disks may be variously arranged on the shaft as desired. In a preferred form of arrangement, the disks are spirally spaced on the shaft, a result obtainable because of the square shaft and square openings. In short, each disk is capable of four positions on the shaft and each disk is preferably arranged at a position corresponding to the next progressive position of a disk preceding it, so that the disks are spirally arranged on the shaft at angular distances of 90 degrees apart. Such an arrangement has been found most satisfactory in practice, although certain circumstances may require that the disks be differently arranged, e. g., at angular distances of 180 degrees.

The operation of the implement, including the improved disks or elements, entails, of course, the drawing of the implement over a field with the axis of the shaft arranged at an angle with respect to the line of draft. The disks or elements, being mounted for rotation with the shaft, rotate continually and the preferred arrangement of the disks on the shaft, as illustrated, provides for the engagement with the soil of the cutting portions of certain disks and the driving portions of other disks. This arrangement insures constant rotation of the shaft, since at all times the driving portion of at least one disk will be in engagement with the ground. Since the spacing or intervals between the fingers 12 is varying, preferably progressively increasing and then decreasing, different leverages will be obtained, and the longer lever arms will be presented at times when rotation of the shaft will be generally most difficult. The drawing illustrates the results obtainable, wherein it will be noted that the greater portion of the second disk is in ground-engaging position, while the more closely spaced fingers of the foremost or first disks are becoming engageable with the ground. There will be, of course, a considerably larger number of disks carried on the shaft and the cooperation between the driving and cutting portions will be readily appreciated. Where the disk is used singly or in separately rotatable relation with another disk, the driving portion will engage the soil as the cutting portion leaves the soil, the engagement between the cutting edge and the soil being sufficient to rotate the disk at that time.

From the foregoing description it will be seen that an improved form of soil-treating element has been provided and that one particular use of the element has been illustrated and described. It will be understood, of course, that the element may be utilized separately or in conjunction with any number of other similar, or even different, elements. Also, it will be appreciated that the cutting and driving portions may be altered without departing from the principle that the element has provided therein a driving and a driven portion. In this respect it will be appreciated that the sizes and shapes of the details may be variously altered and other modifications made in the preferred construction shown and described without departing from the spirit and scope of the invention as defined in the appended claims.

What is claimed is:

1. A soil-engaging element comprising generally a disk having substantially one-half of its peripheral edge forming a ground-engaging edge and another portion of its periphery cut away at intervals to form circumferentially spaced ground-engaging portions.

2. A soil-engaging element comprising generally a disk having a substantially semicircular cutting edge and a diametrically opposite notched driving portion.

3. A soil-engaging element comprising generally a disk having a substantially semicircular cutting edge and a diametrically opposite notched driving portion forming angularly spaced finger portions, the spacing between adjacent fingers progressively increasing and decreasing.

4. A soil-engaging element having a continuous soil-cutting edge and a generally notched driving edge.

5. A soil-engaging element formed generally circular and having opposite, substantially semicircular portions thereof formed respectively continuous and notched.

6. A generally circular soil-engaging element having a portion formed with a continuous arcuate edge and another portion cut away at intervals to form a plurality of closely spaced tooth portions.

7. A generally circular soil-engaging element having a portion of its peripheral edge cut away at intervals and having another substantially equal portion formed substantially continuous.

8. A generally circular soil-engaging element having a portion of its peripheral edge cut away at progressively increasing and decreasing intervals and having another substantially equal portion formed substantially continuous.

9. A generally circular soil-engaging element having a portion of its peripheral edge cut away at varying intervals and having another substantially equal portion formed substantially continuous.

10. A soil-tilling device comprising a gang of axially spaced tilling elements carried for rotation with a shaft, each element being generally circular and having a portion of its peripheral edge cut away at intervals and having another substantially equal portion formed substantially continuous.

11. A soil-tilling device comprising a gang of axially spaced tilling elements carried for rotation with a shaft, each element being generally circular and having a portion of its peripheral edge cut away at intervals and having another substantially equal portion formed substantially continuous, each element being arranged on the shaft with its continuous portion overlying at least part of the cut-away portion of an adjacent element.

12. An implement comprising a plurality of soil-engaging elements arranged in axially spaced relation on a shaft for rotation therewith, each element being generally circular and having opposite, substantially semicircular portions thereof formed respectively continuous and notched, the elements being arranged on the shaft with the continuous portion of one angularly offset with respect to the continuous portion of another.

13. A soil-engaging element comprising generally a disk having a peripheral portion thereof forming an arcuate edge and another peripheral portion notched to form circumferentially spaced tooth portions, the angular extent of the arcuate edge being greater than the angular extent of any one of the tooth portions.

14. A soil-engaging element having a substantially continuous cutting edge and a generally notched driving edge, the angular extent of the cutting edge being greater than the angular extent of any notch.

15. A soil-engaging element having a plurality of peripheral soil-engaging edges, one edge being substantially continuous and another including a plurality of spaced teeth.

BERT R. BENJAMIN.